Aug. 2, 1955 R. M. M. OBERMAN 2,714,629

MARKING CIRCUIT

Filed July 25, 1952

INVENTOR:
ROELOF MAARTEN MARIE OBERMAN
BY Hugh A. Kirk
ATTY.

United States Patent Office 2,714,629

Patented Aug. 2, 1955

2,714,629

MARKING CIRCUIT

Roelof Maarten Marie Oberman, The Hague, Netherlands, assignor to De Staat der Nederlanden, Ten Deze Vertegenwoordigd Door de Directeur-Generaal der Posterijen, Telegrafie en Telefonie, The Hague, Netherlands Application July 25, 1952, Serial No. 300,807

5 Claims. (Cl. 179—18)

This invention relates to a marking circuit for subscribers' lines in an automatic electric telephone or telegraph switching system. More particularly, it deals with a circuit for connecting between the marking or *c*-wires of a line finder and a final selector which correspond to a given subscriber, for identifying the type of line that subscriber has, such as for example a P. B. X line, a restricted line, a toll line, or the like. This identification may be detected by a register, director or other automatic switching controlling circuit in the exchange and used automatically in setting-up a connection through the system to or for that subscriber.

Previously, these line circuits were marked by a resistor connected to and between them and a battery terminal, but such a resistor could not also indicate whether the subscriber was a calling or a called subscriber. In order to make this distinction, it might be considered that only two separate and different resistors be (see Fig. 8) connected to the mutipled marking contacts of that subscriber, one on the line finder and the other on the final selector without a connection between them, to give respectively different potentials in the subscribers marking line circuit at these two different points, when each is separately tested by a director or register. However, when a calling subscriber is busy his *c*-wire or marking wire is directly connected to a terminal of the battery, usually the ground terminal, but since there is no connection between the line finder and final selector, any test of the marking contacts of the final selector by an incoming call does not also provide a potential to indicate that this line might have been already busied by the calling subscriber making an outgoing call. Therefore the final selector would incorrectly select this subscriber's line as free when it actually was busy. Accordingly, the use of two separated resistors directly connected to the marking contacts in this manner is not a solution to the problem of also giving a busy indication of the calling subscriber for incoming calls.

One solution to this whole problem, however, is found in the Oberman co-pending application Serial No. 318,597, filed November 4, 1952, which is a continuation of Oberman's prior co-pending application Serial No. 767,532, filed July 30, 1947. In this prior application an electronic line circuit gives two marks independent of each other, to identify if a subscriber is calling or called as well as if busied, but to do so it is necessary to employ for each subscriber two marking wires, such as the *c*- and the *d*-wires of the selecting switches, a plurality of resistors, and a rectifier so that double use can also be made of the wipers of the *c*- and *d*-wires. In this application the two different marking potentials are provided by two potentiometers having different voltage selecting points for the calling subscriber from that of the called subscriber, and these two potentiometers are then separated by a rectifier so that one of the voltages will not influence the other. Such a circuit, however, involves considerable equipment and expense and is rather complicated.

Accordingly, it is an object of this invention to produce a simple, efficient, effective and economic marking identification circuit for connection between a subscriber's multipled marking contacts on a line finder and his multipled marking contacts on a final selector, which can identify whether the particular subscriber is a calling or a called subscriber as well as if the subscriber is busy either by an incoming or an outgoing call.

Another object is to provide a circuit which materially increases the number of marking identifications which can be employed for different lines in an automatic switching system for connecting a plurality of subscribers.

Another object is to provide such a marking circuit having only one connecting wire over which two different sets of independent identifying features or indications can be determined depending upon which end of the wire is tested.

Another object is to provide such a line marking circuit which is applicable to any type of positioning method for the selecting switches and any circuit arrangement of the line finder and final selectors in an automatic switching system.

Generally speaking, the marking circuit of this invention comprises for each subscriber in an exchange of an automatic switching system, a single wire for connecting his multipled contacts on a final selector with his multipled contacts on a line finder. In this single wire is connected a star or delta grouping of resistances, such as resistors, which are also connected to a battery pole. These three marking resistors are so chosen that when a fixed known testing or busying resistance or ground is connected to one or the other end of the marking circuit, the identifying marking voltage at the ends of the line to be tested, will independently indicate its corresponding value. Then by choosing different combinations of values for these marking resistors, different pairs of potentials can be tested for different types of subscribers.

The indications to be given by the marking circuit of this invention are three, namely, (*a*) indication of type of calling subscriber, (*b*) indication to an incoming call if said subscriber is busy as a calling subscriber, and (*c*) indication of type of called subscriber. The converse of the indication (*b*) namely an indication to an outgoing call that said subscriber is busy as a called subscriber, is not possible because a subscriber cannot do two things at once, namely, make an outgoing call while he is receiving an incoming call.

The above mentioned and other features and objects of this invention and the manner of attaining them are given more specific disclosure in the following description of an embodiment of the invention taken in conjunction with the accompanying drawing, wherein.

Figures 1, 2, 3, 4, 5, 6, 7:
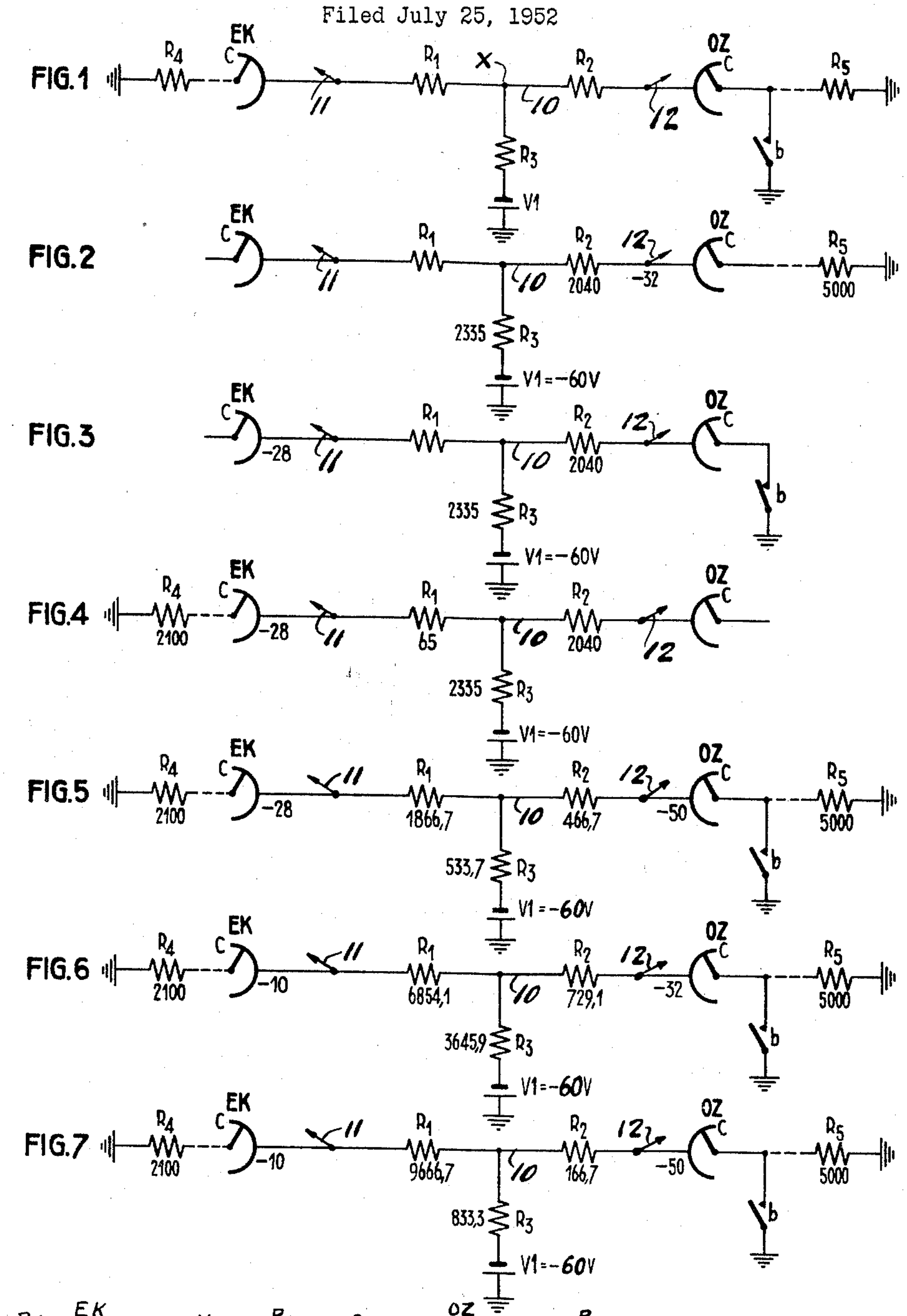
Fig. 1 is a wiring diagram of a marking circuit of this invention, shown connected between the wires of a final selector and a line finder, and the schematic busying and testing circuits which may be connected to it to affect the voltage on the ends of the marking circuit.
Fig. 2 is a wiring diagram of that part of the circuit of Fig. 1 employed for testing the calling subscriber for his identification marking voltage, according to Example I.
Fig. 3 is a wiring diagram of that part of the circuit of Fig. 1 employed for testing a line finder which has been busied by a calling subscriber according to Example I.
Fig. 4 is a wiring diagram of that part of the circuit of Fig. 1 employed for testing or busying a final selector of a called subscriber according to Example I.
Figs. 5, 6 and 7 are wiring diagrams of circuits similar to Fig. 1 with other valued marking resistors corresponding, espectively, to Examples II, III and IV.

Referring to Fig. 1 the marking resistances of this invention are identified as resistors R1, R2 and R3, and are connected in a star arrangement in which resistors R1 and R2 are in series in the line marking circuit wire 10 connected between the multipled contacts 11 of the marking *c*-wire of a given subscriber on his final selector switch EK and the multipled contacts 12 of the marking *c*-wire on his line finder selector switch OZ. Resistor R3 then is connected to a voltage source, such as battery V1. Thus, the junction X of one terminal of each of the resistors R1, R2 and R3 occurs on the wire 10, and their other terminals are connected, respectively, to contacts 11, 12 and battery V1.

Figure 8:
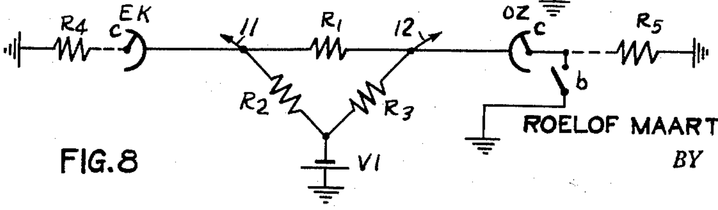
Fig. 8 is a wiring diagram of a circuit embodiment similar to Fig. 1 with the three resistances connected in a delta arrangement as distinguished from the star arrangement of Fig. 1.

Although a star arrangement of marking resistors R1, R2 and R3 are shown, it is well known that they may be replaced by a delta arrangement of three resistors (see Fig. 8) which will produce the same potentials at the three terminals 11, 12 and V1 as any star arrangement shown or described.

In an automatic switching system employing registers, directors or other similar types of controller circuits for arranging the automatic connection through the system, the test of the connection to a proper line finder is often given through a fixed relatively high valued resistance, such as a resistor R5 connected in series with the line marking circuit 10 through the *c*-wiper of line finder OZ and a pole of a battery, for example ground. Then when that subscriber is busy, said same *c*-wiper is usually directly connected to ground such as through a contact *b*. Thus, the line circuit 10 at the line finder OZ may be connected either through a high resistance R5 or directly to the ground by the closure of contact *b*. Each of these connections affect the voltage in the line 10 at the junction X, so that the former indicates the marking voltage of a calling subscriber at contact 12 and the latter indicates the marking voltage of a calling subscriber at contacts 11 which is the same as a busy called subscriber at contacts 11, so that a busy indication of the calling subscriber can be given at the final selector EK the same as if he were a called subscriber.

Similarly, in an automatic switching system when the final selector EK is positioned on the desired subscriber, its *c*-wiper is connected to a fixed lower valued resistance such as a resistor R4, which both tests the marking line circuit to see if one of the contacts 12 of the line finder OZ is busy, and if not, resistor R4 remains connected to said *c*-wiper and to line 10 to indicate it is busy throughout the time that the connection is occupied by the incoming call which sought said desired and called subscriber.

Although the resistances R4 and R5 are not a part of this present invention, their values are important in determining what value should be chosen for the marking resistors R1, R2 and R3. Accordingly, for any given exchange, all the resistors R4 should be the same, and all the resistors R5 should be the same.

In order to more clearly illustrate the principle of this invention specific examples have been chosen in which the battery V1 connected to resistance R3 shown has been given a value of —60 volts. This —60 volts at V1 can be divided into ten two volt intervals from —30 volts down to —10 volts in one direction, which is about the lowest value which can be easily and practically identified in the circuit, and then into ten other two volt intervals from —30 volts up to —50 volts. Thus, different subscriber's contacts 11, for example, may have marking voltages of —28, —26, —24 and so on down to —10 volts, and different subscriber's contacts 12 may have corresponding marking voltages from —32, —34, —36 to —50 volts, and any one of these ten marking voltages for the contacts 11 may be combined with any one of the ten marking voltages for the contacts 12, thus making a possible 100 different marking voltage combinations. However, by using a higher voltage potential at V1, a greater number of two volt marking voltage intervals can be obtained, without departing from the scope of this invention. Accordingly, under these conditions the marking resistor values for the four following examples have been calculated as extreme marking potential combinations.

*Example I*

(Figs. 2, 3 and 4)

In Example I the marking voltage for the called subscriber and that for the calling subscriber are chosen at —28 and —32 volts, i. e. only four volts apart. Since this and each marking circuit according to this invention must give three different types of indications, Figs. 2, 3 and 4 are presented only to show those parts of the circuits of Fig. 1 which are employed for each of these three types of indication.

(*a*) In Fig. 2, the marking circuit is tested for the type of calling subscriber it is, by connecting through a register the resistance R5 to the *c*-wire of the line finder OZ and then through resistors R2 and R3 to battery V1. From this circuit the following equation can be made to determine the relationship of the values of R2, R3 and R5 for a —32 volt indication:

$$\frac{R5}{R2+R3+R5}\times -60 \text{ volts} = -32 \text{ volts} \quad (1)$$

Solving this equation algebraically we find that:

$$\tfrac{7}{8}R5=R2+R3 \quad (2)$$

(*b*) Fig. 3, the circuit for indicating to a called subscriber or the final selector EK, that the subscriber is busy as a calling subscriber, has been shown by the closure of the contact *b*, whereby the following circuit is set up from ground through *c*-wiper of OZ, resistors R2 and R3 to battery V1 for the marking potential of —28 volts at the contacts 11, from which another relationship for the same resistors can be written as follows:

$$\frac{R2}{R2+R3}\times -60 \text{ volts} = -28 \text{ volts} \quad (3)$$

Solving this equation we find:

$$\tfrac{8}{7}R2=R3 \quad (4)$$

So far the value of the resistance R1 is not involved in the circuit and it therefore may be considered as negligible.

(*c*) In Fig. 4, the circuit for indicating the marking potential as a called subscriber is shown, which also may busy the circuit, by connecting the resistor R4 through the *c*-wiper of the final selector EK to the contacts 11, and then through resistors R1 and R3 to battery V1, to produce the potential of —28 volts at contacts 11. For this circuit another equation may be written:

$$\frac{R4}{R1+R3+R4}\times -60 \text{ volts} = -28 \text{ volts} \quad (5)$$

Solving this equation we find:

$$\frac{8}{7}R4=R1+R3 \quad (6)$$

In this particular circuit, however, the resistor R2 may be ignored.

Now for the purpose of convenience and simplification, it will be assumed that the resistor R5 has a value of 5000 ohms, then according to Equations 2 and 4, resistor R2 has a value of 2040 ohms, and resistor R3 has a value of 2335 ohms. Now substituting in the previous Equation 6 and considering R1 as negligible, it is found that R4 should have a value of $\tfrac{7}{8}\times 2335$ ohms or 2090 ohms, which if put in round figures may be taken to be 2100 ohms. Now substituting back in Equation 6 the resistor R1 should leave a value of 65 ohms.

*Example II*

(Fig. 5)

Another example is taken in Fig. 5 wherein the called subscriber marking voltage is still −28 volts, but that of calling subscriber is −50 volts. For this circuit, substituting in the previous Equations 2, 4 and 6 with R4=2100 ohms and R5=5000 ohms, it may be calculated that R1, R2 and R3 have values of 1866.7 ohms, 466.7 ohms and 533.7 ohms, respectively.

*Example III*

(Fig. 6)

For another circuit in which the called subscriber's marking voltage is −10 volts and the calling subscriber's marking voltage is −32 volts, the values for the resistors R1, R2 and R3 have been calculated according to the above Equotations 2, 4 and 6 to be respectively 6854.1 ohms, 729.1 ohms and 3645.1 ohms.

*Example IV*

(Fig. 7)

Similarly for the extreme condition wherein the called subscriber has a marking voltage of −10 volts and the calling subscriber has a marking voltage of −50 volts, which is a vast voltage difference between the contacts 11 and 12, the resistances R1, R2 and R3 have been calculated in a similar manner by the above Equations 2, 4 and 6 to be, respectively, 9666.7 ohms, 166.7 ohms and 833.3 ohms.

It can readily be seen from the above four examples, that the values of the resistances R1, R2 and R3 are within practical limitation ranges, so that the present circuit may be readily applied; and also that the marking voltages employed are well within a range which can easily be detected by the ordinary controller, register, or director circuits of commonly known automatic telephone and telegraph switching systems employed for automatically connecting two subscriber lines through an exchange according to dialed digits as impulses.

While there is described above the principles of this invention in connection with specific apparatus, it is to be clearly understood that this description is made only by way of example and not as a limitation to the scope of this invention.

I claim:

1. In an automatic switching system having a line finder and a final selector and a contact on each corresponding to a given subscriber, the improvement comprising means for producing different voltage identification markings at the two contacts corresponding to a given subscriber when said system is connected to his line finder contact than when connected to his final selector contact, said means including a marking circuit comprising: a single conductor connected between said two contacts, a voltage source, and an arrangement of three resistances having three terminals, said terminals being connected respectively to said two contacts and said voltage source, the values of said resistances being selected to produce in combination with said means said different identification marking voltages.

2. A system according to claim 1 wherein at least one of said three resistances is connected in series in said wire between said two contacts.

3. A system according to claim 1 wherein said resistances are arranged in a star radiating from a common center junction to said three terminals.

4. A system according to claim 1 wherein said three resistances are arranged according to the sides of a triangle in which the corners of said triangle form said three terminals.

5. In an automatic switching system having a line finder switch and a final selector switch, and a contact on each said switch corresponding to a given subscriber, the improvement comprising means for producing different identification markings at said contacts corresponding to a given subscriber when (1) said system is connected to said line finder contact, when (2) said system is connected to said final selector contact and said subscriber is busy, and when (3) said system is connected to said final selector contact and said subscriber is free, said means including a marking circuit comprising: a voltage source, an arrangement of resistances having three terminals, and three separate voltaic connections connected respectively from said three terminals to said line finder contact, said final selector contact, and said voltage source, the values of said resistances being selected in combination with said means to produce said different identification marking voltages.

References Cited in the file of this patent

UNITED STATES PATENTS

| | | |
|---|---|---|
| 2,152,889 | Jedrychowski | Apr. 4, 1939 |
| 2,277,191 | Wilbur | Mar. 24, 1942 |
| 2,502,415 | Bray et al. | Apr. 4, 1950 |
| 2,574,224 | Oberman | Nov. 6, 1951 |
| 2,593,418 | Den Hertog | Apr. 22, 1952 |
| 2,697,750 | Buchner | Dec. 21, 1955 |